US009567462B2

(12) United States Patent
Stoeppelmann et al.

(10) Patent No.: US 9,567,462 B2
(45) Date of Patent: Feb. 14, 2017

(54) POLYAMIDE MOLDING MATERIALS REINFORCED WITH GLASS FIBERS AND INJECTION MOLDED PARTS THEREOF

(75) Inventors: Georg Stoeppelmann, Bonaduz (CH); Ornulf Rexin, Heidelberg (DE); Volker Eichhorn, Chur (CH)

(73) Assignee: EMS-CHEMIE AG, Domat/EMS (CH)

( * ) Notice: Subject to any disclaimer, the term of this patent is extended or adjusted under 35 U.S.C. 154(b) by 1535 days.

(21) Appl. No.: 13/025,953

(22) Filed: Feb. 11, 2011

(65) Prior Publication Data

US 2011/0240930 A1 Oct. 6, 2011

Related U.S. Application Data

(63) Continuation-in-part of application No. 11/966,688, filed on Dec. 28, 2007, now abandoned.

(30) Foreign Application Priority Data

Dec. 28, 2006 (EP) .................................... 06027036

(51) Int. Cl.
*B60C 1/00* (2006.01)
*C08K 7/02* (2006.01)
(Continued)

(52) U.S. Cl.
CPC ................ *C08L 77/00* (2013.01); *C08L 77/02* (2013.01); *C08L 77/06* (2013.01); *C08K 3/40* (2013.01);
(Continued)

(58) Field of Classification Search
USPC ........................................................ 524/494
See application file for complete search history.

(56) References Cited

U.S. PATENT DOCUMENTS 6,534,583 B1   3/2003   Tamura et al.
2003/0158308 A1  8/2003   Nay et al.
(Continued)

FOREIGN PATENT DOCUMENTS

EP   0190011 A1   8/1986
EP   0196194 A1   10/1986
(Continued)

OTHER PUBLICATIONS

Iwamura et al., "Polyamide Resin Composition Mould Product Forming Mix Specific Ternary Copolymer Inorganic Fill Preset Terminal Carboxyl Amino Group Concentrate" Database WPI Week 200656, Derwent Publications Ltd., London, GB; AN 2006-543890; Database No. XP-002425923; JP 2006 193727 (Toray Ind Inc) (Jul. 27, 2006).

(Continued)

*Primary Examiner* — Ling Choi
*Assistant Examiner* — Thuy-Ai Nguyen
(74) *Attorney, Agent, or Firm* — Sughrue Mion, PLLC

(57) ABSTRACT

The present invention relates to reinforced polyamide molding materials with high notch impact strengths, comprising low viscous polyamides and flat glass fibers as a reinforcing medium, characterized in a polyamide matrix, comprising the following components: (A) 0 to 60 wt.-% of at least one aliphatic, partly crystalline polyamide with a solution viscosity, measured in m-cresol (0.5 wt-%), of $\eta_{rel}$ less than 1.9, (B) 0 to 60 wt.-% of at least one amorphous or microcrystalline polyamide based on aliphatic, cycloaliphatic or aromatic diamines, dicarboxylic acids, lactams and/or aminocarboxylic acids, preferably with 6 to 36 carbon atoms, or a mixture of such homopolyamides and/or copolyamides, wherein the components (A) and (B) fulfill the condition: (A)+(B)=20 to 60 wt.-% and that, in the case of a mixture of components (A) and (B), at least 50 weight parts aliphatic (Continued)

blocks (A) are present in the mixture, and a filler component, comprising: (C) 40 to 80 wt.-% flat glass fibers with elongated shape, and the glass fibers have a non-circular cross-sectional area and a size ratio of the main cross-sectional axis to the secondary cross-sectional axis of between 2 to 5, particularly between 3 and 4, and (D) 0 to 40 wt.-% particle like or layer like fillers, with the prerequisite that carbon fibers are excluded, wherein the polyamide molding materials optionally comprise up to 5 wt.-% of further usual additives and auxiliary agents (E), and wherein the weight of the components (A) to (E) sums up to 100%.

32 Claims, 7 Drawing Sheets

(51) Int. Cl.
    *C08L 7/02*           (2006.01)
    *C08L 77/00*         (2006.01)
    *C08L 77/02*         (2006.01)
    *C08L 77/06*         (2006.01)
    *C08K 3/40*          (2006.01)
    *C08K 7/14*          (2006.01)

(52) U.S. Cl.
    CPC .............. *C08K 7/14* (2013.01); *C08L 2205/02* (2013.01); *C08L 2205/16* (2013.01)

(56) References Cited

U.S. PATENT DOCUMENTS

| | | |
|---|---|---|
| 2007/0123632 A1 | 5/2007 | Rexin et al. |
| 2008/0021143 A1 | 1/2008 | Thullen et al. |

FOREIGN PATENT DOCUMENTS

| | | |
|---|---|---|
| EP | 0199328 A2 | 10/1986 |
| EP | 0246620 A2 | 11/1987 |
| EP | 0376616 A2 | 4/1990 |
| EP | 0400935 A2 | 5/1990 |
| EP | 0532963 A1 | 3/1993 |
| EP | 628602 A1 | 12/1994 |
| EP | 0728812 A1 | 8/1996 |
| EP | 0957131 A2 | 4/1999 |
| EP | 0934979 A2 | 8/1999 |
| EP | 0957131 A2 | 11/1999 |
| JP | 10219026 | 8/1998 |
| JP | 2004285487 | 10/2004 |
| JP | 2006045390 A | 2/2006 |
| JP | 2006193727 A | 7/2006 |
| WO | 200240591 A1 | 3/2002 |
| WO | 0240591 A1 | 5/2003 |
| WO | 2008070157 | 6/2008 |

OTHER PUBLICATIONS

Jacques et al., B. M., Hydrolytic ageing of polyamide 11. Hydrolysis kinetics in water. Polymer 43:6439-6447 (2002).

POLYAMIDE MOLDING MATERIALS REINFORCED WITH GLASS FIBERS AND INJECTION MOLDED PARTS THEREOF

CROSS-REFERENCED TO RELATED APPLICATIONS

This application is a continuation in part of Ser. No. 11/966,688, filed Dec. 28, 2007, the entire contents of which are hereby incorporated by reference.

FIELD OF INVENTION

The present invention relates to reinforced polyamide molding materials comprising low viscous polyamides and glass fibers with flat shape, especially glass fibers with non-circular cross-sectional area and a dimensional relation of the main cross-sectional axis to the secondary cross-sectional axis of between 2 and 5. The present invention further relates to a process for the production of polyamide molding materials, as well as molded parts made thereof, i.e. in particular injection molded parts.

According to the invention a polyamide with a solution viscosity of $\eta_{rel}$ less than 1.9 (measured in m-cresole, 0.5 wt.-%, 20° C.) is regarded as a low viscous polyamide. The relative viscosity of $\eta_{rel}$ less than 1.9 corresponds to a molecular weight ($M_n$, numerical average) of the polyamides of less than 20,000 g/mol.

BACKGROUND OF THE INVENTION

Reinforced polyamides are playing an increasing role in the field of technical construction materials, since they have high rigidity, high toughness and high heat distortion temperature. Fields of application are, for example, internal and external parts in the automotive sector and in the field of other means of transport, housing material for appliances and equipment for telecommunication, consumer electronics, household appliances, machinery equipment, apparatus in the field of heating and fixing parts for installation. Metal like properties are important for parts, for example, in the automotive sector, but these can only be achieved by highly filled, reinforced molding materials. For thin-walled parts, particularly a high flow length of the molding materials is necessary, which flow length, however cannot or can only very poorly be achieved in molding materials that are reinforced by endless fibers.

There is also a special advantage of reinforced polyamides in the exceptionally good bonding between polymer matrix and reinforcing materials. This is true even at high reinforcement levels, resulting in products with high tensile modulus of elasticity. However, the toughness of the products is not sufficient to fulfil all requirements.

Polymers which are regarded as polyamides in the present invention that have basic building blocks, which are held together by amide bonds (—NH—CO—), and which can be prepared by polycondensation or polymerization of monomers, as for example dicarboxylic acids, dicarboxylic acid halides, dinitriles, diamines, aminocarboxylic acids and/or lactames. They can be homopolyamides or copolyamides. The average molecular weight of the polyamide should be more than 5,000, preferably more than 10,000 but less than 20,000, corresponding to solution viscosities of $\eta_{rel}$ lower than 1.9, especially $\eta_{rel}$ lower than 1.8, particularly preferred $\eta_{rel}$ lower than 1.7.

EP 0 190 011 B1 describes glass fibers with elliptical or rectangular cross-section, as well as their manufacture. The use of these particular glass fibers for the manufacture of composite parts is mentioned. Due to the larger surface of the fibers, higher strength values result in the composites.

EP 0 196 194 B1 describes a strand consisting of a variety of glass monofilaments with a non-circular cross-section, as well as their manufacture. The cross-section of the glass fibers can be oval, elliptical, cocoon shaped or polygonal.

EP 0 199 328 B1 describes a fabric for printed circuit boards, which is essentially made of glass fibers with non-circular cross-section. The individual fibers have oval, elongated or elliptical cross sections. Unsaturated polyester resins, epoxy resins, phenol resins, polyimide resins or PTFE are described as matrices for this fabric.

EP 0 246 620 B1 describes an article made of a glass fiber reinforced thermoplastic resin. The, glass fibers have a rectangular, elliptical or cocoon shaped cross section. It is shown that glass fibers with non-circular cross-section have advantages in terms of strength and toughness, especially at a high degree of reinforcement (≥60%).

EP 0 376 616 B1 describes a thermoplastic polymer composition comprising a thermoplastic resin and 1 to 65% of a fibre like reinforcement with a non-circular cross-section, wherein the cross-sectional area and the ratio of the perpendicular cross-sections of the reinforcing fibers are characterized in more detail. The cross-section of the reinforcing fibers has a semicircular or arcuate contour. The composition is characterized by high dimensional stability and reduced warpage.

EP 0 400 935 B1 describes a flame retardant fiber reinforced polyester composition that includes 1 to 60 wt % glass fibers. According to EP 0 400 935 B1, the used glass fibers have a cross-sectional shape, which is selected from the group of flattened, elliptical, oval, partly circular, curved and rectangular cross-sectional shapes. These flame retardant reinforced polyester composites according to EP 0 400 935 B1 show a decreased deformation without their mechanical properties being adversely influenced by crystalline polyester resins. In this respect, it was found according to EP 0 400 935 B1 that the deformation, i.e. warping of crystalline polyester resins can be reduced without reducing the mechanical properties of the resin, for example, the bending strength and rigidity and the processability.

According to JP 10219026 A2 the thermoplastic matrix is reinforced by a mixture of glass fibers with a circular cross-section and glass fibers with a flat cross section to reduce warpage of thermoplastic parts. Polyamide 66 is used as a polymer matrix in the only example of this document.

JP 2004285487 A1 describes a bundle of glass fibers, consisting of glass filaments with a flat cross-section, which are hold together by a non-volatile sizing, and a thermoplastic composition, consisting of 5 to 75% of glass fiber bundles and a polyolefin matrix.

JP 2006045390 A2 describes a granulate reinforced by long glass fibers, consisting of a thermoplastic matrix and up to 60 wt.-% of glass fibers with a flat cross section. Granulate length and fiber length is identical. Advantageous features of molded parts made from the reinforced composition according to JP 2006045390 A2 are good surface quality and high impact strength.

Polyamide molding materials, which have good mechanical properties and a very small warpage, are described in the still unpublished patent application EP 06014372.4. These properties are obtained by a combination of transparent polyamide with fibrous reinforcing materials and particulate fillers. Regarding the fibrous reinforcement materials there are basically no restrictions. They are preferably selected from the group consisting of glass fibers, carbon fibers, metal fibers, aramide fibers, whiskers and mixtures thereof. The glass fibers can be added as endless fibers or as chopped glass fibers. The glass fibers can have round, oval or rectangular cross section.

The also still unpublished application EP 05025216.2 describes reinforced polyamide molding materials made from a blend of polyamide 66 and a copolyamide 6T/6I. A mixture of glass fibers and carbon fibers is used as a reinforcing material. To further increase the rigidity, a portion of the glass fibers is substituted by carbon fibers, so that a hybrid fiber reinforced compound is used.

SUMMARY OF THE INVENTION

It is therefore an object of the present invention to provide new reinforced polyamide molding materials based on low viscosity polyamides, i.e. having molecular weights ($M_n$) of less than 20,000 g/mol, which are clearly superior to the molding materials with glass fibers with a circular cross-section in terms of mechanical properties and processing properties. The molded parts made from the molding materials should also have high transversal rigidity and transversal resistance.

The above object is achieved by the polyamide molding materials according to claim 1, the process according to claim 13, the use according to claim 15, the process for manufacturing the molded bodies according to claim 16, and the molded article, especially the injection-molded article according to claim 17.

The objects of the invention are achieved by providing reinforced polyamide molding materials with high notch impact strength, comprising low viscous polyamides and flat glass fibers as a reinforcing medium, comprising a polyamide matrix, comprising the following components:
(A) 0 to 60 wt.-% of at least one aliphatic, partly crystalline polyamide with a solution viscosity $\eta_{rel}$, measured in m-cresol (0.5 wt-%), of less than 1.9,
(B) 0 to 60 wt.-% of at least one amorphous or microcrystalline polyamide based on aliphatic, cycloaliphatic or aromatic diamines, dicarboxylic acids, lactams and/or aminocarboxylic acids, with 6 to 36 carbon atoms, or a mixture of such homopolyamides and/or copolyamides, with a solution viscosity $\eta_{rel}$, measured in m-cresol (0.5 wt-%), of less than 1.9,
wherein the components (A) and (B) fulfil the condition:

$(A)+(B)=20$ to 60 wt.-% and that, in the case of a mixture of components (A) and (B), at least 50 weight parts aliphatic blocks (A) are present in the mixture, and
a filler component, comprising:
(C) 40 to 80 wt.-% flat glass fibers with elongated shape, and the glass fibers have a non-circular cross-sectional area and a size ratio of the main cross-sectional axis to the secondary cross-sectional axis of between 2 to 5, preferably between 3 and 4, and
(D) 0 to 40 wt.-% particle like or layer like fillers,
with the proviso that carbon fibers are excluded, wherein the polyamide molding materials optionally comprise up to 5 wt.-% of further usual additives and auxiliary agents (E), and
wherein the weight of the components (A) to (E) sums up to 100%.

The process for producing the reinforced polyamide molding materials involves using conventional compounding machines at barrel temperatures set to 240° C. to 320° C., wherein the polymeric part is first melted and then cut flat glass fibers and/or other fillers are added to the molten polyamide.

Molded parts from the polyamide molding materials are produced by injection molding, extrusion, pultrusion, blow molding or other molding techniques.

Therefore, in embodiment (I) the invention relates to reinforced polyamide molding materials with high notch impact strength, comprising low viscosity polyamides and flat glass fibers as a reinforcing medium, comprising a polyamide matrix, comprising the following components:
(A) up to 60 wt.-%, particularly from 20 to 60 wt.-%, of at least one aliphatic, partly crystalline polyamide with a solution viscosity, measured in m-cresol (0.5 wt.-%), of $\eta_{rel}$ less than 1.9, as well as a filler component comprising (C) 40 to 80 wt.-% flat glass fibers with elongated shape, wherein the glass fibers have a non-circular cross-sectional area and a size ratio of the main cross-sectional axis to the secondary cross-sectional axis of between 2 to 5, especially between 3 and 4, and optionally (D) up to 40 wt.-% particle like or layer like fillers, and optionally up to 5 wt.-% further usual additives and auxiliary agents (E), wherein the weight percents of the components (A), (C) and optionally (D) and (E) sum up to 100 wt.-%, with the prerequisite that carbon fibers are excluded.

Generally speaking, the solution viscosity $\eta_{rel}$, measured in m-cresol (0.5 wt-%), of component (A) is preferably in the range of more than 1.3 to less than 1.9, preferably of more than 1.35 to less than 1.9, and more preferably of more than 1.4 to less than 1.9, most preferred is the range of 1.6-1.9.

In an alternative embodiment (II), the present invention relates to reinforced polyamide molding compounds with high notch impact strength, comprising low-viscous polyamides and flat glass fibers as reinforcing medium, comprising a polyamide matrix, comprising up to 60 wt.-%, particularly from 20 to 60 wt.-%, of at least one aliphatic, partly crystalline polyamide (B) with a solution viscosity, measured in m-cresol (0.5 wt.-%), of $\eta_{rel}$ less than 1.9, as well as a filler component comprising (C) 40 to 80 wt.-% flat glass fibers with elongated shape, wherein the glass fibers has a non-circular cross-sectional area and a size ratio of the main cross-sectional axis to the secondary cross-sectional axis of between 2 to 5, especially between 3 and 4, and optionally (D) particle like or layer like fillers, and optionally usual additives and auxiliary agents (E), with the prerequisite that carbon fibers are excluded, wherein the weight percents of the components (B), (C) and optionally (D) and (E) sum up to 100 wt.-%.

Generally speaking, the solution viscosity $\eta_{rel}$, measured in m-cresol (0.5 wt-%), of component (B) is preferably in the range of more than 1.3 to less than 1.9, preferably of more than 1.35 to less than 1.9, and more preferably of more than 1.4 to less than 1.8, most preferred is the range of 1.5-1.7.

In another embodiment (III) of the present invention, it relates to reinforced polyamide molding material with high notch impact strength, comprising low viscosity polyamides and flat glass fibers as a reinforcing medium, comprising a polyamide matrix, comprising the following components:
(A) up to 60 wt.-%, particularly from 20 to 60 wt.-%, of at least one aliphatic, partly crystalline polyamide with a solution viscosity, measured in m-cresol (0.5 wt-%), of $\eta_{rel}$ less than 1.9,
(B) up to 60 wt.-% of at least one amorphous or microcrystalline polyamide based on aliphatic, cycloaliphatic or aromatic diamines, dicarboxylic acids, lactams and/ or aminocarboxylic acids, preferably with 6 to 36 carbon atoms, or a mixture of such homopolyamides and/or copolyamides,
wherein the components (A) and (B) fulfil the condition:

(A)+(B)=20 to 60 wt.-% and that there are at least 50 weight parts of aliphatic blocks (A) present in the mixture (of the components (A) and (B)), and
a filler component, comprising:
(C) 40 to 80 wt-% flat glass fibers with elongated shape, wherein the glass fibers have a non-circular cross-sectional area and a size ratio of the main cross-sectional axis to the secondary cross-sectional axis of between 2 to 5, especially between 3 and 4 have, and optionally
(D) 0 to 40 wt-% particle like or layer like fillers, and
(E) conventional additives and auxiliary agents.
wherein the weight percents of the components (A) to (E) sum up to 100%, with the prerequisite that carbon and carbon fibers are excluded.

DETAILED DESCRIPTION OF THE INVENTION

Figure 1:
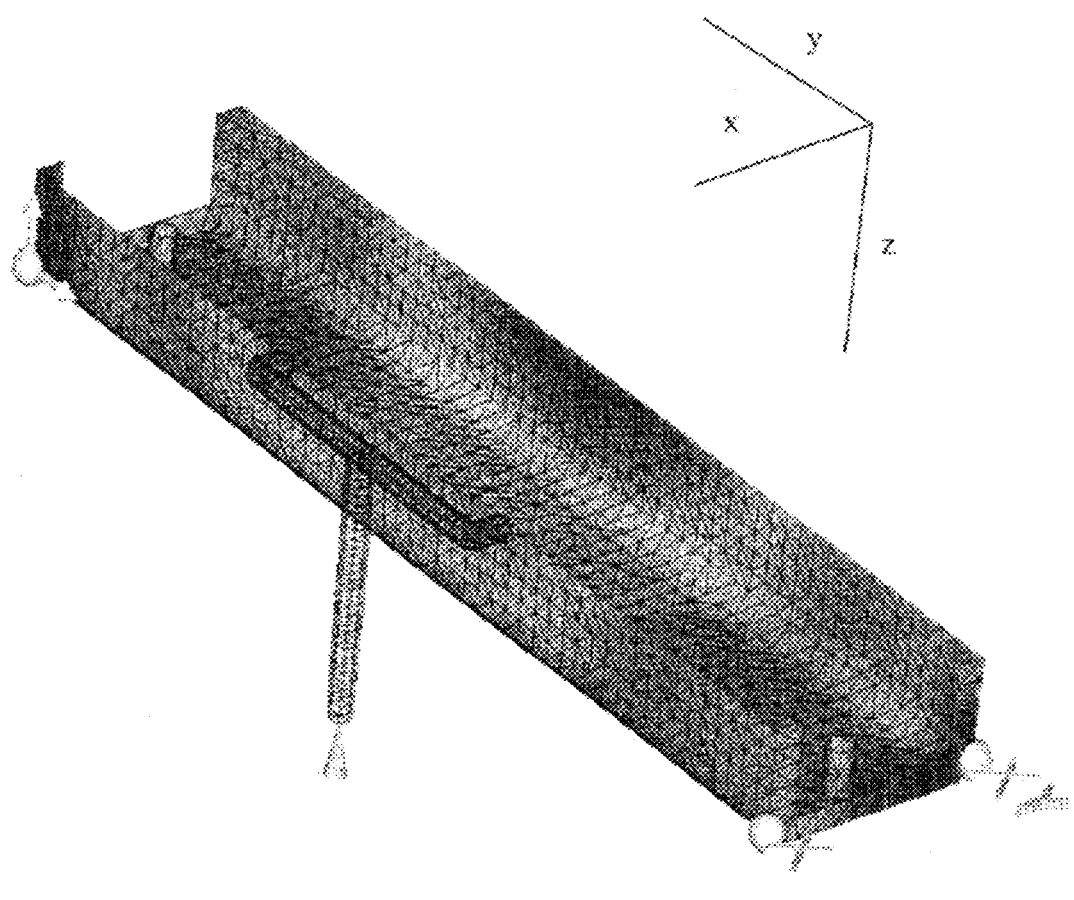
FIG. 1 shows an injection molded body for warpage measurement. Warpage is determined at this injection molded body according to FIG. 1. The sprue is made from the bottom in z direction.

According to the invention it has been found that flat glass fibers (ratio of the cross-sectional axes >2) show significant advantages in the mechanical properties, processing and surface quality compared to those with circular cross-section. This is particularly true for high glass fiber contents of >50%. Thus, in inventive polyamide molding materials, particularly for example, in PA12 with 65 wt.-% glass fibers with otherwise same formulation, twice as high notch impact strength has been found using flat glass fibers when compared to glass fibers with a circular geometry. These high toughness values are also found, if an inventive polyamide molding material, particularly a PA12 with lower molecular weight, is used. A PA12 with lower molecular weight has a low melt viscosity. Therefore, it has advantages in the injection molding process.

Usually lower toughness values are found in polyamides with low molecular weights than in those with higher molecular weights. However, at high filling levels the thermoplastic processing is complicated due to higher viscosity of the higher molecular polyamides. This manifests in difficult form filling, sink marks and poor surface quality.

According to the invention it has been further found that, especially for high percentages of flat glass fibers, products can be made, which have good processability, low warpage, high surface quality and substantially higher toughness compared to those materials, which contain glass fibers that have a circular cross-section, when using the inventive molding materials, preferably with the low viscous, aliphatic partly crystalline polyamides, more preferably with low viscous PA12.

Compared to glass fibers with a circular cross-section, glass fibers with a cross-section with different values for the main axis and the secondary axis (flat glass fibers) have a significantly higher packing density at high levels of reinforcement, which results in higher moduli and strength, especially transverse to the fiber orientation. However, the expected improvement in rigidity and strength is only completely realized, if the rather smaller spaces between the flat glass fibers are sufficiently infiltrated with polymer matrix, and the matrix allows sufficient forwarding of the forces occurring during deformation. Only the polyamides with low viscosity according to the invention make full use of the potential of geometrically advantageous flat glass fibers.

Especially components which are under pressure during use, as for example valve housings or water meter housings, benefit from the increased rigidity and strength traverse to the fiber orientation, because burst pressure and deformation resistance are improved among others. Due to the higher transverse rigidity of components made from the inventive molding materials, which is 10 to 40% above the level of molding compounds with glass fibers with circular cross-section, depending on the composition, there are significantly fewer deformations of the component under varying pressure loads. This is of particular interest, because molding compounds based on aliphatic polyamides with usual glass fibers of circular cross-section often show low transverse rigidity compared to the longitudinal rigidity. This shortcoming can be offset by using flat glass fibers in combination with polyamides, since not only the individual values for the longitudinal and transverse rigidity are increased, but also the ratio of transverse to longitudinal rigidity.

The matrix of polyamide molding materials, which is used according to the invention, is based, as described above, on at least one aliphatic, partly crystalline polyamide (component (A)) or at least one amorphous and microcrystalline polyamide (component B), or a mixture of components A and B, wherein at least 50 wt.-parts aliphatic components (A) must be present in the mixture of (A) and (B).

The aliphatic, partly crystalline polyamide (component (A)) has a solution viscosity, measured in m-cresol (0.5 wt-%), of $\eta_{rel}$ less than 1.9, preferably by $\eta_{rel}$ less than 1.8, particularly $\eta_{rel}$ less than 1.7. A polyamide from the group consisting of polyamide 6, polyamide 46, polyamide 66, polyamide 11, polyamide 12, polyamide 1212, polyamide 1010, polyamide 1012, polyamide 1112, Polyamide 610, polyamide 612, polyamide 69, polyamide 810 or their mixtures, blends or alloys may be used as an aliphatic polyamide.

In a particular embodiment of the invention, at least two aliphatic polyamides with different solution viscosities are used together with the other components. For instance, a PA12 with a solution viscosity in the range from 1.45 to 1.67 and a PA12 with a solution viscosity in the range from 1.75 to 1.9 are mixed, wherein the mixing ratio of low and higher viscous PA12 is between 80:20 and 20:80.

In an alternative embodiment, the polyamide molding material, includes up to 50 wt.-%, preferably up to 20 wt.-%, more preferably up to 15 wt.-%, of at least one amorphous or microcrystalline polyamide (component (B)) based on aliphatic, cycloaliphatic or aromatic diamines, dicarboxylic acids, lactams and/or aminocarboxylic acids, preferably with 6 to 36 carbon atoms, or a mixture of such homopolyamides and/or copolyamides in addition to the component (A). According to this embodiment the molding materials preferably contain 1-20 wt.-%, particularly from 3 to 15 wt.-% component (B).

The following systems are preferred for the microcrystalline and amorphous polyamides (component (B)) and/or copolyamides used according to the invention:

Polyamide based on aliphatic, cycloaliphatic or aromatic diamines, dicarboxylic acids, lactams and/or aminocarboxylic acids, preferably with 6 to 36 carbon atoms, or a mixture of such homopolyamides and/or copolyamides. The cycloaliphatic diamines are preferably MACM, IPD (isophorone diamine), and/or PACM, with or without additional substituents. The aliphatic dicarboxylic acid is preferably an aliphatic dicarboxylic acid with 2-36, preferably 8-20, linear or branched carbon atoms, more preferably with 10, 12, 13, 14, 16 or 18 carbon atoms.

MACM stands for the ISO-name bis-(4-amino-3-methylcyclohexyl)-methane, which is commercially available under the trade name 3,3'-dimethyl-4-4'-diaminodicyclohexylmethane as Laromin C260-typ (CAS No. 6864-37-5), preferably with a melting point between −10° C. and 0° C. A number, like for example in MACM12, stands for an aliphatic linear C12 dicarboxylic acid (DDS, dodecanic diacid), with which the diamine MACM is polycondensated. IPS is isophthalic acid and PACM stands for the ISO-name bis(4-amino-cyclohexyl)-methane, which is commercially available under the trade name 4,4'-Diaminodicyclohexylmethane as dicycan-type (CAS No. 1761-71-3), preferably with a melting point of between 30° C. and 45° C.

A homopolyamide is preferably selected from the group, consisting of MACM12, MACM13, MACM14, MACM16, MACM18, PACM12, PACM13, PACM14, PACM16, PACM18 and/or a copolyamide selected from the group MACM12/PACM12, MACM13/PACM13, MACM14/PACM14, MACM16/PACM16, MACM18/PACM18. Mixtures of such polyamides are also possible.

Polyamides based on aromatic dicarboxylic acids with 8 to 18, preferably 8-14 carbon atoms, or a mixture of such homopolyamides and/or copolyamides, preferably based on PXDA and/or MXDA, more preferably based on lactams and/or aminocarboxylic acids, wherein the aromatic dicarboxylic acids are preferably TPS, naphthalene dicarboxylic acid and/or IPS.

Polyamides selected from the group, consisting of MACM9-18, PACM9-18, MACMI/12, MACMI/MACMT, MACMI/MACMT/12, 6I6T/MACMI/MACMT/12, 3-6T, 6I6T, TMDT, 6I/MACMI/MACMT, 6I/PACMI/PACMT, 6I/6T/MACMI, MACMI/MACM36, 6I, 12/PACMI or 12/MACMT, 6/PACMT, 6/6I, 6/IPDT or mixtures thereof, wherein 50 mol-% of IPS may be replaced by TPS.

These amorphous and microcrystalline polyamides (component B) have a glass transition temperature of more than 110° C., preferably of more than 130° C. and more preferably of more than 150° C. The relative solution viscosity is in the range from 1.4 to less than 1.9 (measured in m-cresol, 0.5% by weight, measured at 20° C.), preferably in the range between 1.5 and 1.8 and more preferably in the range between 1.55 and 1.75.

The microcrystalline polyamides have a heat of fusion in the range of 4 to 25 J/g (determined by DSC), the amorphous polyamides have heats of fusion of less than 4 J/g. Microcrystalline polyamides based on the diamines MACM and PACM are preferably used. Examples of such polyamides are the systems PA MACM9-18/PACM9-18, wherein PA MACM12/PACM12 with a PACM percentage of more than 55 mol-% (relative to the whole amount of diamine) is particularly used according to the invention.

Preferably, amorphous and/or microcrystalline polyamides with a glass transition temperature of at least 130° C., preferably at least 150 C, are used as component (B).

In another preferred embodiment microcrystalline polyamides with a melt enthalpy of at least 4 J/g, preferably in the range of 4 to 25 J/g, are used as component (B).

The flat glass fibers used according to the invention are glass fibers with a flat shape, and a non-circular cross-sectional area, with the ratio of perpendicular cross-sectional axes greater than or equal to 2, and the smaller cross-sectional axis of a length ≥3 µm. The glass fibers have the form of chopped glass strands with a length of 2 to 50 mm. The glass fiber amount in the molding materials according to the invention is between 40 and 80 wt.-%, preferably between 50 and 70 wt.-%. In a special embodiment of the invention the glass fiber amount is always more than 60 wt.-%, preferably in the range of 60-70 wt.-%.

By using chopped glass strands according to the invention granules of long glass fiber can be excluded. Surprisingly, high notch impact values have been achieved according to the invention, which have otherwise only been observed for long-fiber reinforcement and polyamides with high molecular weights and which are here observed for chopped glass fibers. Also, the individual filaments are not held together by any "glue" or special sizings. According to the invention, high notch impact values, particularly at high reinforcement values are achieved: notch impact values of more than 25 kJ/m$^2$ for a glass fiber percentage of 50 to 60 wt.-%, notch impacts of more than 30 kJ/m$^2$ for a glass fiber percentage of more than 60 wt.-%.

Furthermore high flow lengths are achieved according to the invention, especially for the thin-walled (injection molding) parts made from the inventive molding materials: flow lengths of >200 mm at reinforcement levels of ≥40 wt.-%. The surface quality of the injection-molded parts made from the molding materials is also quite excellent, as can be seen from the attached Table 1 (gloss values).

Optionally, additional fillers and reinforcing agents can be added to the polyamide molding compounds (component (D)) in quantities of 0 to 40 wt.-%, wherein carbon fibers are excluded.

The molding materials according to the invention may also include other additives (E), for example from the group of inorganic stabilizers, organic stabilizers, lubricants, dyes, nucleating agents, metallic pigments, metal gewgaw, metal coated particles, halogen-comprising flame retardants, halogen-free flame retardants, impact modifiers, antistatics conductivity additives, mold releasing agents, optical brighteners, natural sheet silicates, synthetic sheet silicates or mixtures of the above additives.

For example, carbon black and/or carbon nanotubes can be used as antistatics in the inventive molding materials.

The use of carbon black can also improve the black color of the molding material.

For example, kaolins, serpentines, talc, mica, vermiculite, illite, smectite, montmorillonite, hectorite, double hydroxides or mixtures thereof may be used as sheet silicates in the inventive molding materials. The sheet silicates may be surface treated, but may also be untreated.

For example, antioxidants, light stabilizers, UV stabilizers, UV absorbers, or UV-Blocker may be used as stabilizers and aging protection products, respectively, in the inventive molding materials.

As outlined above, the flat glass fibers (C) are added as chopped glass strands according to the invention. These glass fibers have a diameter of the small cross-sectional axis of 3 to 20 µm and a diameter of the large cross-sectional axis of 6 to 40 µm wherein the ratio of orthogonal cross-sectional axes is between 2 and 5, preferably between 3 and 4. Particularly, E glass fibers are used according to the invention. However, all other glass fiber types, such as A, C, D, M, S, R glass fibers or any mixtures thereof or mixtures with E glass fibers may be used. The usual sizings for polyamide are used, such as various amino silane sizings.

Specifically preferred are reinforced polyamide molding materials with high notch impact strength made on a compounding machine, comprising low viscosity polyamides and flat glass fibers as a reinforcing medium, comprising a polyamide matrix, comprising the following components:
(A) 0 to 60 wt.-% or 20-60 wt.-% of at least one partly crystalline polyamide selected from the group consisting of Polyamide 66, Polyamide 1010, Polyamide 12 or mixtures thereof with a solution viscosity ηrel, measured in m-cresol (0.5 wt-%), of more than 1.3 and of less than 1.9,
(B) 0 to 60 wt.-% of at least one amorphous polyamide selected from the group consisting of PA 6I/6T, PA MACM 9-18 or mixtures thereof with a solution viscosity ηrel, measured in m-cresol (0.5 wt-%), of more than 1.3 and of less than 1.9,
wherein the polyamide components of said reinforced polyamide molding material consist of components (A) and (B) and wherein the polyamide components (A) and (B) both have a numerical average molecular weight of more than 10,000 g/mol and of less than 20,000 g/mol,
wherein the components (A) and (B) fulfil the condition:

$$(A)+(B)=20 \text{ to } 60 \text{ wt.-\%}$$

and wherein, in the case of a mixture of components (A) and (B), at least 50 weight parts aliphatic blocks (A) are present in the mixture, and
a filler component, comprising:
(C) 40 to 80 wt.-% flat glass fibers with elongated shape, and the glass fibers have a non-circular cross-sectional area and a size ratio of the main cross-sectional axis to the secondary cross-sectional axis of between 2 to 5, preferably between 3 and 4, and
(D) 0 to 40 wt.-% particle like or layer like fillers,
with the proviso that carbon fibers are excluded, wherein the polyamide molding materials optionally comprise up to 5 wt.-% of further conventional additives and auxiliary agents (E), and
wherein the weight of the components (A) to (E) sums up to 100%
and wherein said molding material is adapted to and capable of providing thin-walled injection moulded parts having a flow length of greater than 200 mm.

The preparation of the polyamide molding materials according to the invention can be effected on customary compounding machines, such as, for example, single-screw or twin-screw extruders or screw kneaders. As a rule, the polymeric fraction is first melted and the reinforcing material (glass fibers) can be introduced at the same point or at different points of the extruder, for example by means of a side feeder. The compounding is preferably effected at set barrel temperatures of 280° C. to 320° C. Gentler processing of the inventive molding materials results in reinforced molded parts, wherein the fiber length distribution is significantly shifted to higher fiber lengths. Thus, the inventive molding materials have an average fiber length, which is by 20 to 200% higher as compared to molded parts based on glass fibers with a round cross-section.

The molded parts produced from the molding materials according to the invention are used for the production of interior and exterior parts, preferably having a supporting or mechanical function, in the electrical, furniture, sport, mechanical engineering, sanitary and hygiene areas, medicine, energy and drive technology, in the automotive sector and the sector relating to other means of transport, or housing material for devices and apparatuses for telecommunication, entertainment electronics, household appliances, mechanical engineering, the heating sector or fixing parts for installations or for containers and ventilation parts of all types.

In particular the area of metal die casting replacement in which extremely high rigidity in combination with good toughness is expected may be mentioned as possible applications for the molded parts produced from the molding materials according to the invention.

Applications

Electrical Appliance Sector

Stop and/or adjusting elements for electrical hand tools with or without integrated electrical functions (molded interconnect devices, MID)

connecting rods and/or pistons for hammer drills in homogenous design, i.e. comprising one material, or as a hybrid part, i.e. comprising a combination of materials housings, gear housings for right angle grinders, drills, electric planes or grinding machines with or without integrated electrical functions (MID) in homogeneous design or as a hybrid part, certain functional areas (e.g. force transmission surfaces, sliding surfaces, decorative layer areas, grip region) may comprise another compatible or incompatible material (e.g. for targeted delamination or deformation, predetermined breaking point, force or torque limitation)

tool holders, e.g. chucks or fixing means sewing machine housings, sliding tables with or without integrated electrical functions (MID)

housings or housing parts for telecommunication (e.g. mobile phone) and consumer electronics Sanitary and Hygiene Sector Housings and/or functional elements (e.g. for pumps, gears, valves) for oral irrigators, toothbrushes, comfort toilets, shower cabinets, hygiene centers with or without integrated electrical functions (MID) in homogeneous design or as a hybrid part diverse connectors or connection modules pump housings, valve housings or water meter housings with or without integrated electrical functions (MID) in homogeneous design or as a hybrid part Household Appliance Sector Housings and/or functional elements for mechanical, electrical or electromechanical closing systems, locking systems or sensors with or without integrated electrical functions (MID) for refrigerators, chest refrigerators, chest freezers
ovens, cookers, steam cookers
dishwashing machines Automotive Sector
Housings and/or holders with or without integrated electrical functions (MID) in homogenous design or as a hybrid part for
controls/switches (e.g. for exterior mirror adjustment, seat position adjustment, lighting, driving direction indicator)
interior sensors, e.g. for seat occupation
exterior sensors (e.g. for parking aids, ultrasonic or radar distance meters)
sensors in the engine space (e.g. vibration or knocking sensors)
interior and exterior lights
motors and/or drive elements in the interior and exterior area (e.g. for seat comfort functions, exterior mirror adjustment, headlight adjustment and/or tracking, curve light)
monitoring and/or control systems for vehicle drive (e.g. for media transport and/or regulation of, for example, fuel, air, coolant, lubricant)
Mechanical functional elements and/or sensor housings with or without integrated electrical functions (MID) for
closing systems, locks, pull-to systems, e.g. in the case of vehicle swivel doors, sliding doors, engine space flaps or hoods, tailgates, vehicle windows
connectors for fluid lines, connectors in the field of vehicle electrics and vehicle electronics Mechanical Engineering
ISO standard parts and/or machine elements (e.g. screws, nuts, bolts, wedges, shafts, gear wheels) in standard dimensions or application-specific design or homogenous design
ISO standard parts and/or machine elements, such as, for example, screws, nuts, bolts, wedges, shafts in standard dimensions or application-specific design or as a hybrid part, certain functional regions, such as, for example, force transmission surfaces, sliding surfaces, decorative layer areas, may comprise another compatible or incompatible material (for example for targeted delamination, predetermined breaking point, force/torque limitation)
supports, stands, plinths for processing machines, such as, for example, upright drilling machines, table drilling machines, cutting machines or combination machines for metal and/or wood processing
insert parts, e.g. threaded bushes
self-tapping screws Energy and Drive Technology Sector
frames, housings, support parts (substrate) and/or fixing elements for solar cells with or without integrated electrical functions (MID) in homogeneous design or as a hybrid part
tracking and/or adjusting elements (e.g. for bearings, hinges, joints, drawbars, bumpers) for collectors
pump housings and/or valve housings with or without integrated electrical functions (MID) in homogenous design or as a hybrid part Medical Equipment Sector
frames, housings, support parts with or without integrated electrical functions (MID) in homogeneous design or as a hybrid part for monitoring devices and/or equipment for supporting vital functions
disposable instruments, such as, for example, scissors, clamps, forceps, knife handles in homogeneous design or as a hybrid part
constructions for short-term or emergency fixing of fractures in homogeneous design or as a hybrid part
walking aids with or without integrated electrical functions (MID) and/or sensors for load monitoring in homogeneous design or as a hybrid part.

The following examples will explain the invention, without limiting it.

EXAMPLES

In the examples and comparative examples (CE) the following materials were used:
PA Type A: Polyamide-12 with $M_n$ of approximately 17,000 g/mol ($\eta_{rel}$=1.66), EMS-CHEMIE AG, Switzerland
PA Type B: Polyamide MACM12 with $\eta_{rel}$=1.75, Tg=155° C., ΔH<1 J/g, EMS-CHEMIE AG, Switzerland
PA Type C: Polyamide-66 with $\eta_{rel}$=1.82, RADICI, Italy
PA Type D: Polyamide 6I6T (70:30), $\eta_{rel}$=1.52, Tg=125° C., ΔH<1 J/g, EMS-CHEMIE AG, Switzerland
Glass fiber type A: NITTOBO CSG3PA-820, 3 mm long, 28 μm wide, 7 μm thick, aminosilane sizing, NITTO BOSEKI, Japan (flat glass fibers, according to the invention)
Glass fibers Type B: CS 7928, 4.5 mm long, 10 μm diameter, BAYER AG, Germany (glass fibers with circular cross-section, state of the art)

The molding materials of the compositions in Table 1 are prepared on a twin-screw extruder from the film Werner & Pfleiderer type ZSK25. The granuless PA12 are metered into the feed zone. The glass fiber is metered into the polymer melt via a side feeder 3 barrel unit before the die.

The barrel temperature has been set as an ascending temperature profile up to 300° C. At 150 to 200 rpm, 10 kg throughput has been achieved. After cooling of the strands in a water bath the granular properties were measured after granulation and drying at 110° C. for 24 h.

The test specimens have been produced on an Arburg injection molding machine, wherein the cylinder temperatures were set to be 240° C. to 300° C. and a circumferential screw velocity was set to 15 m/min. The molding temperature was chosen as 80-100° C.

The measurements were performed according to the following standards and at the following test specimens.
Tensile Modulus of Elasticity:
ISO 527 with a traction speed of 1 mm/min
ISO tensile bar, standard: ISO/CD 3167, type A1, 170×20/10×4 mm, temperature 23° C.
Breaking Strength and Elongation at Break:
ISO 527 with a speed of 5 mm/min
ISO tensile bar, standard: ISO/CD 3167, type A1, 170×20/10×4 mm, temperature 23° C.
Charpy Impact Strength:
ISO 179/*eU
ISO test bar, standard: ISO/CD 3167, type B1, 80×10×4 mm, temperature 23° C. *1=not instrumented, 2=instrumented
Charpy Notch Impact Strength:
ISO 179/*eA
ISO test bar, standard: ISO/CD 3167, type B1, 80×10×4, temperature 23° C. *1=not instrumented, 2=instrumented
Glass Transition Temperature (Tg), Melting Enthalpy (ΔH)
ISO 11357-1/-2

Granules

The Differential Scanning calorimetry (DSC), was performed with heating rate of 20° C./min. The temperature is specified for the Onset (Tg).

Relative Viscosity:

DIN EN ISO 307, in 0.5 wt-% m-cresol solution, temperature 20° C.

MVR: (Melt Volume Rate)

According to ISO 1133 at 275° C. and a load of 5 kg

Flow Length:

The flow length were determined using an Arburg injection molding machine (type: ARBURG-ALLROUNDER 320-210-750). Flow coils of the dimension 1.5 mm×10 mm were produced at a melt temperature of 278° C. (290° C.) and a molding temperature of 80° C. (100° C.).

Gloss:

Gloss measurement was performed according to ISO2813 with gloss meter Minolta Multi Gloss 268.

The glass fiber content is determined via TGA at the granules by melting a sample of approximately 10 mg with a heating rate of 20 K/min to 800° C. From 600° C. the flushing medium nitrogen is substituted by air. The remaining amount corresponds to the proportion of glass.

If is not otherwise indicated in the table, the specimens are used in dry state. To do this, the specimens are stored in a dry environment after the injection molding for at least 48 h at room temperature.

TABLE 1

| Example | | 1 | CE1 | 2 | CE2 | 3 | CE3 |
|---|---|---|---|---|---|---|---|
| Composition | | | | | | | |
| PA type | wt.-% | 50 | 50 | 35 | 35 | 25 | 25 |
| PA type B | wt.-% | 0 | 0 | 0 | 0 | 10 | 10 |
| glass fibers type A | wt.-% | 50 | 0 | 65 | 0 | 65 | 0 |
| glass fibers type B | wt.-% | 0 | 50 | 0 | 65 | 0 | 65 |
| Properties | | | | | | | |
| MVR (275° C./5 kg) | cm³/10 min | 77 | 65 | 45 | 15 | 25 | 17 |
| glass fiber percentage | wt.-% | 49.3 | 49.6 | 64.6 | 64.9 | 65 | 64.9 |
| tensile strength at break | MPa | 13200 | 12700 | 19800 | 19000 | 20500 | 19400 |
| tensile strength at elasticity | MPa | 180 | 165 | 213 | 183 | 220 | 188 |
| elongation at break | % | 3.3 | 4.2 | 2.5 | 3.5 | 2.7 | 3.4 |
| impact strength Charpy, 23° C. | kJ/m² | 98 | 90 | 96 | 60 | 105 | 72 |
| notch impact strength, Charpy, 23° C. | kJ/m² | 29 | 22 | 32 | 17 | 34 | 18 |
| Glow below 85° | % | 96 | 89 | 94 | 83 | 95 | 85 |
| flow length (278 C./80° C.) | mm | 345 | 280 | 244 | 189 | 250 | 185 |

The following examples illustrate the advantages of inventive molding materials in terms of improved transversal strength and transversal rigidity.

To determine the rigidity and strength longitudinal and transversal to the sprue, test specimens of the dimension 10×100×2 mm were used. They were both separated from the middle of plates of the dimension 1001×00×2 mm (with film-sprue respectively). The plates were made from the molding materials of example 2 (flat glass fibers: according to the invention) and CE2 (glass fibers with a round cross-section).

TABLE 2

Example 2a and comparative example CE2a

| | | Example | |
|---|---|---|---|
| | | 2a | CE2a |
| tensile modulus elasticity, longitudinal | MPa | 12900 | 12550 |
| tensile modulus of elasticity transversal | MPa | 9170 | 6480 |
| ratio tensile modulus of elasticity transversal/longitudinal | | 0.71 | 0.52 |
| tensile strength at break longitudinal | MPa | 139 | 124 |
| tensile strength at break transversal | MPa | 70 | 58 |
| ratio tensile strength break transversal/longitudinal | | 0.50 | 0.47 |

Compared to the molding materials with round glass fibers, the inventive molding material (example 2a) shows an increase of more than 40% in transversal rigidity and a 20% increase in transversal strength.

TABLE 3

Example 4 and Comparative Example 4

| | | Example | |
|---|---|---|---|
| | | 4 | CE4 |
| PA type C | wt.-% | 37.5 | 37.5 |
| PA type D | wt.-% | 12.5 | 12.5 |
| glass fibers type A | wt.-% | 50 | 0 |
| glass fibers type B | wt.-% | 0 | 50 |
| MVR (275° C./5 kg) | cm³/10 min | 95 | 75 |

TABLE 3-continued

Example 4 and Comparative Example 4

| | | Example | |
|---|---|---|---|
| | | 4 | CE4 |
| percentage of glass fiber | wt.-% | 49.5 | 49.7 |
| tensile modulus of elasticity, longitudinal | MPa | 15870 | 13830 |
| tensile modulus of elasticity, transversal | MPa | 9314 | 6920 |
| ratio tensile modulus of elasticity transversal/longitudinal | | 0.58 | 0.50 |
| tensile strength at break longitudinal | MPa | 204 | 184 |
| tensile strength at break transversal | MPa | 134 | 110 |
| ratio tensile strength at break transversal/longitudinal | | 0.66 | 0.58 |
| impact strength, Charpy, 23° C. | kJ/m$^2$ | 75 | 70 |
| notch impact strength, Charpy, 23° C. | kJ/m$^2$ | 25 | 17 |
| flow length (mass temperature: 290° C., molding temperature: 100° C.) | mm | 370 | 305 |
| filling pressure during injection molding (manufacture of test specimen) | bar | 1000 | 1300 |
| average fiber length in the molding material (BIAX test specimen) | µm | 350 | 220 |

For the tensile test, special test specimens (BIAX, published in Noss'Ovra staff magazine, December 2006, No 12, volume 29, EMS-CHEMIE AG) were used, which enable anisotropic measurement of rigidity and strength.

It results from the comparison between example 4 (according to the invention) and comparative example 4, that transversal rigidity can be enhanced by more than 10% and cross-strength can be enhanced by more than 20% via a combination of flat glass fibers with the inventive low viscous polyamide molding material.

After incinerating the test specimens, the length distribution of the glass fibers, and the average fiber length have been determined. The inventive molding materials contained glass fibers with significantly increased fiber length.

Production of the test specimens via injection molding shows another advantage of the inventive molding materials, namely significantly reduced filling pressure as compared to the usual molding materials, which are reinforced with round glass fibers. The combination of low viscous polyamides and flat glass fibers enables the production of injection molded parts with a filling pressure reduced by 20-30%.

Warpage was determined according to the following specification:

Warpage Measurement (see FIGS. 1 to 7)

Warpage was determined at an injection molded body according to FIG. 1. The sprue is done from the bottom in z direction. The injection molded bodies were made at 280° C. melt temperature, and 80° C. molding temperature.

Figure 2:
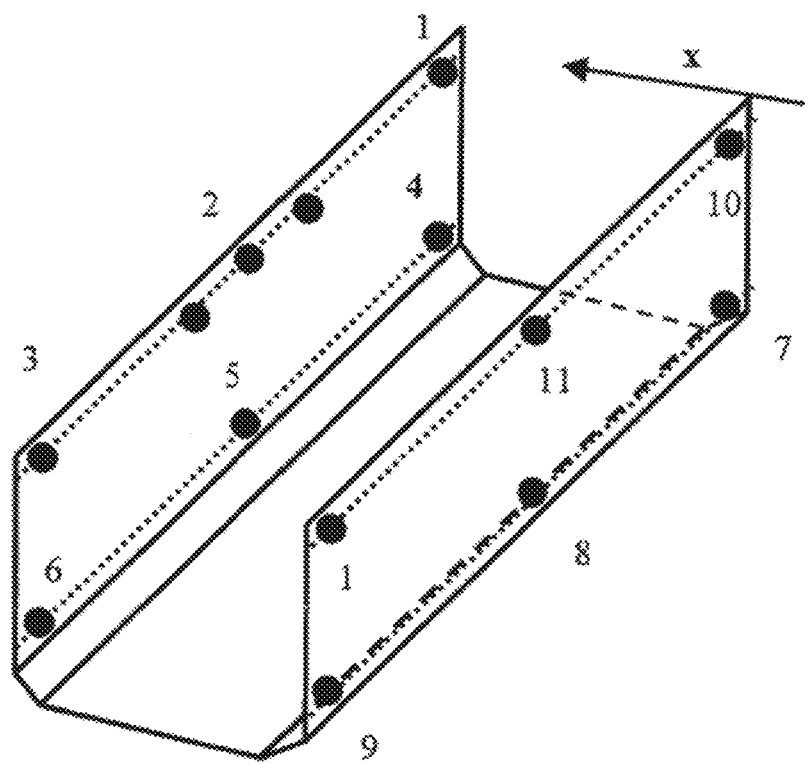
FIG. 2 shows the location of the measurement points in the injection molded body in x direction for warpage measurements.
Figure 3:
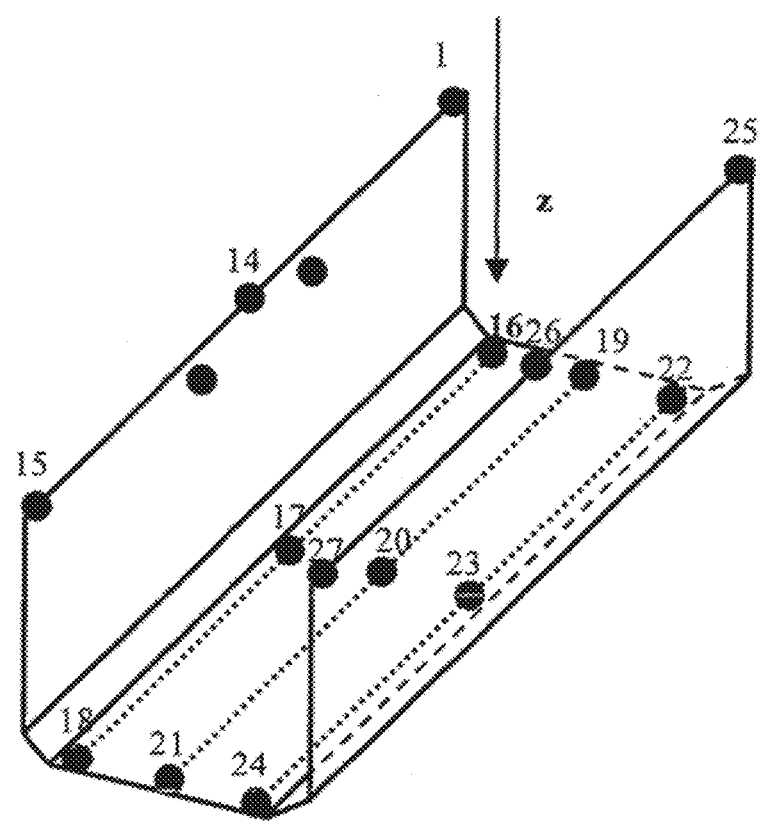
FIG. 3 shows the location of the measurement points in the injection molded body in z direction for warpage measurements.
Figure 4:
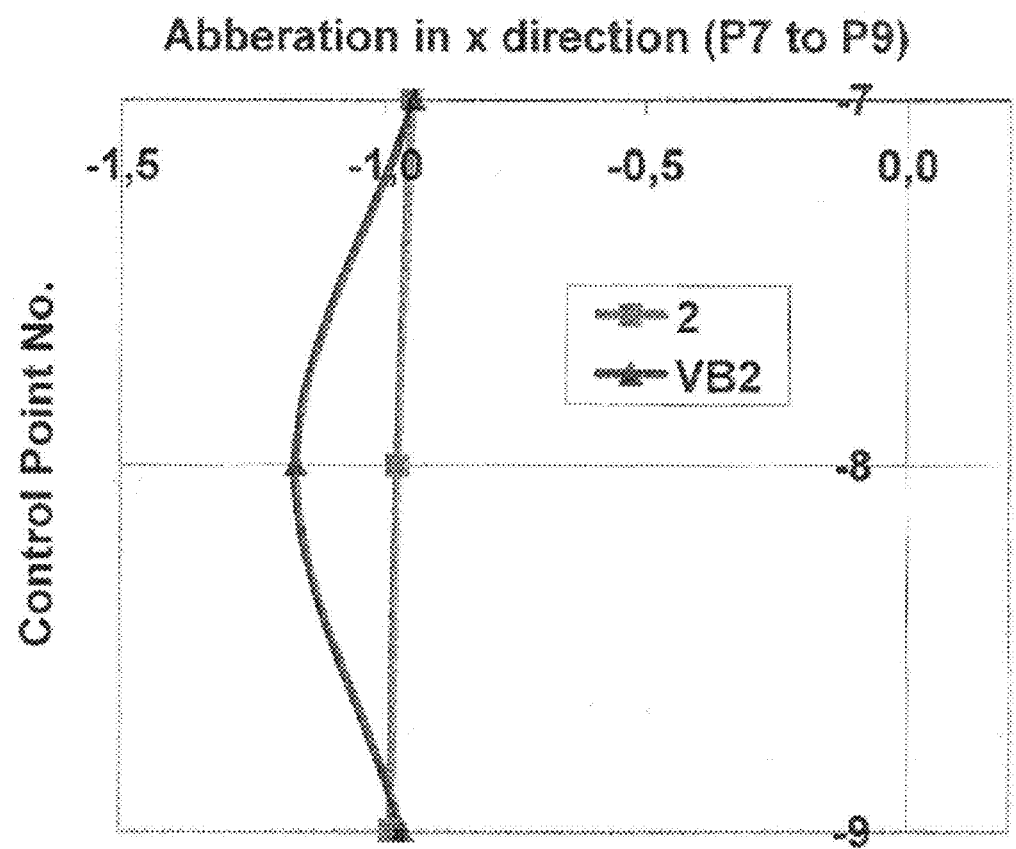
FIG. 4 shows the warpage of the measurement points 7 to 9 (see FIG. 2) in x direction.
Figure 5:
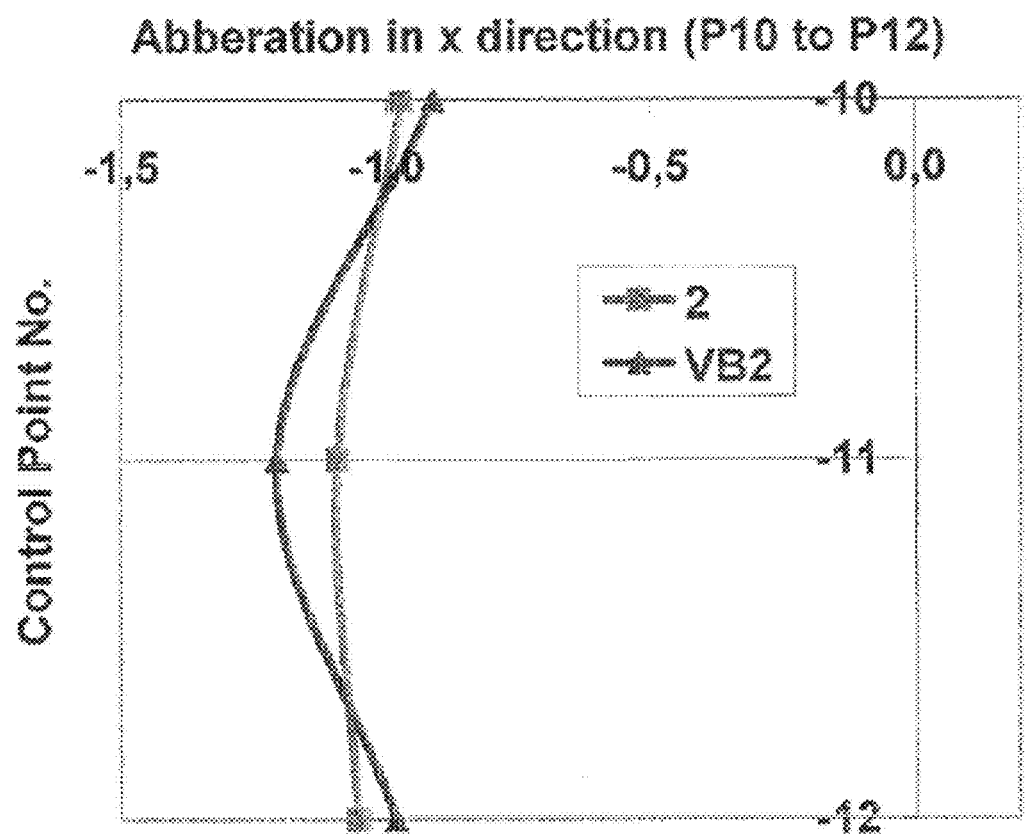
FIG. 5 shows the warpage of the measurement points 10 to 12 in x-direction.
Figure 6:
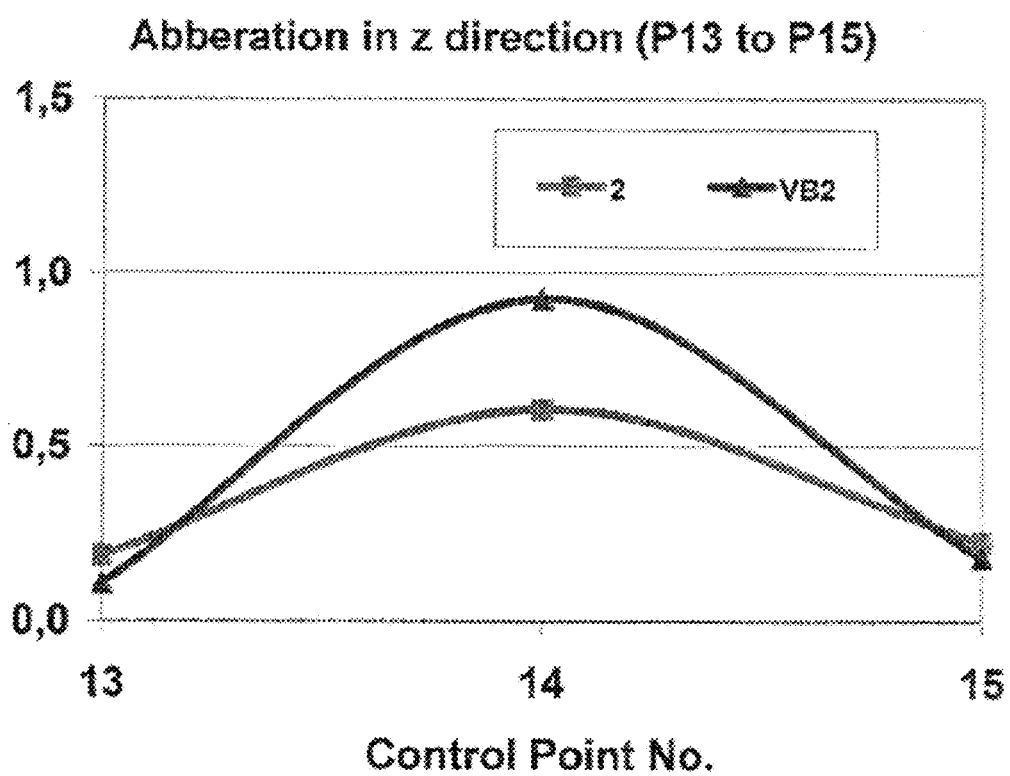
FIG. 6 shows the warpage of the measurement points 13 to 15 in z direction.
Figure 7:
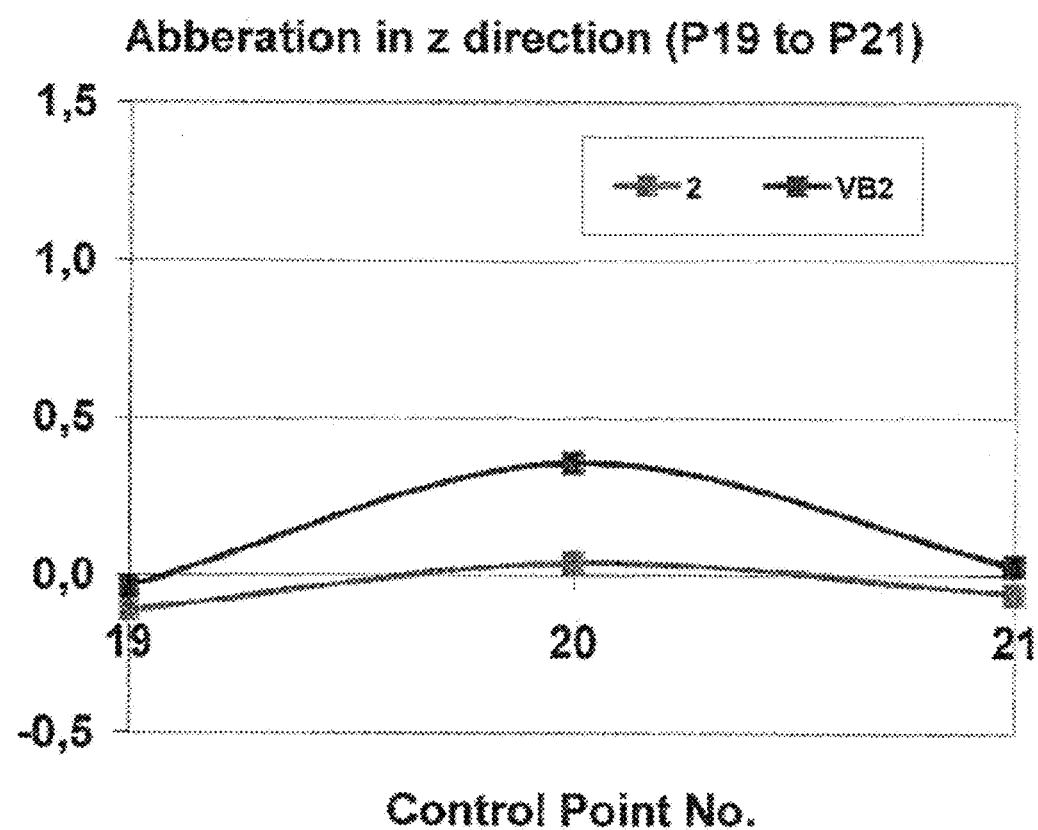
FIG. 7 shows the warpage of the measurement points 19 to 21 in z direction.

The positions 1 to 12 were determined in x direction in relation to point 4 and the positions 13 to 27 were determine in z direction in relation to point 16 using a coordinate measuring machine of the brand Tesa Validator 10 (see FIGS. 2 and 3).

These position deviations are plotted for the individual positions. They are shown in FIGS. 4 to 7.

In the case of the injection molded body with flat glass fibers, a noticeably more isotropic behavior regarding form preservation and a significantly lower average warpage is observed over all measuring points.

To further document the superior properties of the materials presented here, comparative measurements were carried out for systems only comprising component A but no component B as given in Table 4. All relative viscosities given in Tables 4 and 5 are for 0.5 weight % solutions in m-cresol.

TABLE 4

| | | Example | | |
|---|---|---|---|---|
| | | 5 | 6 | CE5 |
| Composition | | | | |
| Component A (PA12) | Weight % | 34.825% | 34.825% | 34.825% |
| | EMS Product | Grilamid L16 | Grilamid L20 | Grilamid L25 |
| | Rel. Viscosity | 1.72 | 1.85 | 2.25 |
| Component B Additives | Weight % | — | — | — |
| Irganox 1010 (Ciba) | Weight % | 0.175 | 0.175 | 0.175 |
| Glass Fiber CSG3PA-820 (Nittobo) (axis ratio 4:1) | Weight % | 65 | 65 | 65 |
| Properties (dry) | | | | |
| Flowability | MVR 275° C./21.6 kg [ml/10 min] | 190 | 72 | 34 |
| Flowability | Flow Length 280° C./80° C./ 1000 bar [mm] | 240 | 200 | 180 |
| Suitability for Metallization* | Grade | + | ○ | − |
| Notched Impact | [kJ/m2] | 24 | 21 | 20 |
| Impact Charpy | [kJ/m2] | 85 | 79 | 50 |
| Tensile Modulus | [MPa] | 19'200 | 18'500 | 18'500 |
| Tensile Strength at Break | [MPa] | 185 | 175 | 160 |
| Elongation at Break | [%] | 2.5 | 2.9 | 2.3 |

TABLE 4-continued

| | | Example | | |
|---|---|---|---|---|
| | | 5 | 6 | CE5 |
| Tensile Modulus longitudinal | [MPa] | 16'300 | 15'500 | 15'000 |
| Tensile Strength at Break longitudinal | [MPa] | 190 | 180 | 170 |
| Elongation at Break longitudinal | [%] | 2.4 | 2.7 | 2.9 |
| Tensile Modulus transversal | [MPa] | 8'700 | 7'500 | 7'400 |
| Tensile Strength transversal | [MPa] | 108 | 107 | 103 |
| Elongation at Break transversal | [%] | 3.0 | 3.4 | 4.0 |

*"Suitability for Metallization" means the absence of surface cloudiness (often described as orange-peel effect) with increasing distance to the gate.

High-quality-looking metallic lacquers or piano lacquers require the complete absence of any surface superstructure. This also applies to an after treatment with NCVM (Non Conductive Vacuum Metallization).

Grade: + good surface quality; optimally qualified for metallization

○ partial superstructure apparent; suitable to only a limited extent for metallization − inadequate surface quality; unsuitable for metallization A low viscosity PA12 (component A) reinforced with 65 wt.-% of flat glass fibers (component C) as given in example 5 is clearly superior to a further example 6 based on medium viscosity PA12 which is again superior to a comparative example CE 5 from the respective high viscosity PA12, each with exactly the same reinforcement. The only exception is "elongation at break" which is high for all examples but generally known to slightly increase with viscosity.

To further document the superior properties of the materials presented here, comparative measurements were carried out for systems comprising component A as well as component B as given in Table 5, namely for a mixture of polyamide PA66 (component A) and low viscosity copolyamide PA6I/6T (component B) reinforced with 65 wt.-% of flat glass fibers.

TABLE 5

| | | Example | | | |
|---|---|---|---|---|---|
| | | 7 | 8 | CE6 | CE7 |
| Composition | | | | | |
| Component A (PA66) | Weight % | 29.775 | 29.775 | 29.775 | 29.775 |
| | Product Name (Manufacturer) | Radipol A40 (Radici) | Radipol A45 (Radici) | Stabamid 31/A00S (Rhodia) | Radipol A105 (Radici) |
| | Rel. Viscosity | 1.78 | 1.85 | 1.91 | 1.96 |
| Component B (PA6I/6T) Grivory G21 (EMS) | Weight % | 9.925 | 9.925 | 9.925 | 9.925 |
| | Rel. Viscosity | 1.52 | 1.52 | 1.52 | 1.52 |
| Additives | | | | | |
| Irganox 1098 (Ciba) | Weight % | 0.3 | 0.3 | 0.3 | 0.3 |
| Hostanox PAR24 (Clariant) | Weight % | 0.1 | 0.1 | 0.1 | 0.1 |
| Glass Fiber CSG3PA-820 (Nittobo) (axis ratio 4:1) | Weight % | 60 | 60 | 60 | 60 |
| Properties (dry) | | | | | |
| Flowability | Melt volume rate 275° C./21.6 kg [ml/10 min] | 87 | 76 | 65 | 41 |
| Flowability | Flow Length 300° C./100° C./ 1000 bar [mm] | 220 | 200 | 190 | 180 |
| Suitability for Metallization* | Grade | + | + | ○ | ○ |
| Notched Impact | [kJ/m2] | 12 | 12 | 11 | 13 |
| Impact Charpy | [kJ/m2] | 64 | 68 | 59 | 64 |
| Tensile Modulus | [MPa] | 21'400 | 21'700 | 21'200 | 21'600 |
| Tensile Strength at Break | [MPa] | 255 | 260 | 250 | 260 |
| Elongation at Break | [%] | 2.0 | 2.0 | 2.0 | 2.1 |
| Tensile Modulus longitudinal | [MPa] | 19'800 | | | 20'400 |

TABLE 5-continued

| | | Example | | | |
|---|---|---|---|---|---|
| | | 7 | 8 | CE6 | CE7 |
| Tensile Strength at Break longitudinal | [MPa] | 240 | | | 245 |
| Elongation at Break longitudinal | [%] | 1.8 | | | 1.8 |
| Tensile Modulus transversal | [MPa] | 12'900 | | | 13'000 |
| Tensile Strength transversal | [MPa] | 129 | | | 130 |
| Elongation at Break transversal | [%] | 1.4 | | | 1.3 |

"Suitability for Metallization" means the absence of surface cloudiness (often described as orange-peel effect) with increasing distance to the gate.

High-quality-looking metallic lacquers or piano lacquers require the complete absence of any surface superstructure. This also applies to an after treatment with NCVM (Non Conductive Vacuum Metallization).

Grade: + good surface quality; optimally qualified for metallization

○ partial superstructure apparent; suitable to only a limited extent for metallization − inadequate surface quality; unsuitable for metallization The mixture of polyamide PA66 (component A) and low viscosity copolyamide PA6I/6T (component B) reinforced with 65 wt.-% of flat glass fibers (component C) shows constant mechanical properties essentially independent of PA66 viscosity in the range between 1.78 and 1.96. But low viscosity PA66 is necessary for maximum flow length and surface quality (suitability for metallization).

The invention claimed is:

1. Reinforced polyamide molding materials with high notch impact strength, comprising low viscous polyamides and flat glass fibers as a reinforcing medium, consisting of:
a polyamide matrix, consisting of the following components:
(A) 0 to 60 wt.-% of an aliphatic, partly crystalline polyamide, consisting of polyamide 66, with a solution viscosity $\eta_{rel}$, measured in m-cresol (0.5 wt-%), of more than 1.3 and of less than 1.9,
(B) 0 to 60 wt.-% of at least one amorphous or microcrystalline polyamide selected from the group consisting of: polyamide 6I/6T, polyamide MACM9-18, polyamide MACMI/12, or a mixture thereof, with a solution viscosity $\eta_{rel}$, measured in m-cresol (0.5 wt-%), of more than 1.3 of less than 1.9,
wherein the components (A) and (B) fulfil the condition:

(A)+(B)=20 to 60 wt.-% and that, in the case of a mixture of components (A) and (B), at least 50 weight parts aliphatic blocks (A) are present in the mixture, and
a filler component, consisting of:
(C) 40 to 80 wt.-% flat glass fibers with elongated shape, and the glass fibers have a non-circular cross-sectional area and a size ratio of the main cross-sectional axis to the secondary cross-sectional axis of between 2 to 5, and
(D) 0 to 40 wt.-% particle like or layer like fillers,
with the proviso that carbon fibers are excluded, wherein the polyamide molding materials optionally comprise up to 5 wt.-% of further usual additives and auxiliary agents (E), and
wherein the weight of the components (A) to (E) sums up to 100%.

2. Reinforced polyamide molding materials with a high notch impact strength, comprising low viscous polyamides and flat glass fibers as a reinforcing medium, consisting of:
a polyamide matrix, consisting of the following components:
(A) 20 to 60% by weight of at least one aliphatic, partly crystalline polyamide selected from the group consisting of: polyamide 12, polyamide 66, or a mixture thereof, in each case with a solution viscosity $\eta_{rel}$, measured in m-cresol (0.5 wt-%), of more than 1.3 and less than 1.9,
(B) 0 to 50% by weight, of at least one amorphous or microcrystalline polyamides selected from the group consisting of: polyamide 6I/6T, polyamide MACM9-18, polyamide MACMI/12 or a mixture thereof, with a solution viscosity $\eta_{rel}$, measured in m-cresol (0.5 wt-%), of more than 1.3 and of less than 1.9,
with the prerequisite that in the case of a mixture of components (A) and (B), at least 50 weight parts aliphatic blocks (A) are present in the mixture, and
a filler component, consisting of:
(C) 40 to 80 wt.-% flat glass fibers with elongated shape, and the glass fibers have a non-circular cross-sectional area and a size ratio of the main cross-sectional axis to the secondary cross-sectional axis of between 2 to 5, and
(D) 0 to 40 wt.-% particle like or layer like fillers,
with the prerequisite that carbon fibers are excluded, wherein the polyamide molding materials optionally comprise up to 5 wt.-% of further usual additives and adjuvants (E), and
wherein the weight of the components (A) to (E) sums up to 100%.

3. Polyamide molding materials according to claim 1, wherein the flat glass fibers have the form of cut glass with a length of 2 to 50 mm.

4. The polyamide molding materials according to claim 1, wherein the flat glass fibers are in amounts of between 50 and 70 wt.-% in the molding materials.

5. The polyamide molding materials according to claim 1, wherein the flat glass fibers, which are added as chopped glass strands, have a diameter of the main cross-sectional axis of 6 to 40 μm and a diameter of the secondary cross-sectional axis from 3 to 20 μm, wherein the ratio of the perpendicular cross-sectional axes is between 2 and 5.

6. The polyamide molding materials according to claim 1, wherein the flat glass fibers are selected from E glass fibers, A glass fibers, C glass fibers, D glass fibers, M glass fibers, S glass fibers or R glass fibers or mixtures thereof.

7. The polyamide molding materials according to claim 1, wherein at least one aliphatic, partly crystalline polyamide of component (A) has a solution viscosity $\eta_{rel}$, measured in m-cresol (0.5 wt.-%), of $\eta_{rel}$ less than 1.8.

8. The polyamide molding materials according to claim 1, wherein at least one aliphatic, partly crystalline polyamide is polyamide 66.

9. The polyamide molding materials according to claim 1, wherein the molding materials have notch impact strengths of at least 30 kJ/m² (measured according to Charpy at 23° C. according to ISO 179/2-1 eA) at a glass fiber percentage ≥60 wt.-% or a notch impact strength of more than 25 kJ/m² (measured according to Charpy at 23° C. according to ISO 179/2-1 eA) at a glass fiber percentage of 50 to 60 wt.-%.

10. The polyamide molding materials according to claim 1, characterized in a high flow length, for thin-walled injection-molded parts made from the molding materials, of >200 mm at reinforcing levels with component (C) of over 40 wt.-%.

11. The polyamide molding materials according to claim 1, wherein further additives and adjuvants (E) in the molding material are selected from the group of inorganic stabilizers, organic stabilizers, lubricants, dyes, metallic pigments, metal gewgaw, metal coated particles, halogen-containing flame retardants, halogen-free flame retardants, impact modifiers, antistatics, conductivity additives, mold releasing agents, optical brighteners, natural sheet silicates, synthetic sheet silicates or mixtures of the above additives.

12. A process for the preparation of polyamide molding materials according to claim 1, using usual compounding machines at barrel temperatures set to 240° C. to 320° C., wherein firstly the polymeric part is molten and then cut flat glass fibers and/or other fillers are added.

13. The process for the preparation of polyamide molding materials according to claim 1, wherein firstly a compound is respectively produced from the components (A) and/or (B) and the fillers (C) and optionally (D) and optionally the additives (E) in granular form and then these granules are mixed, and then further quantities of granules of the components (A) and (B) are optionally added, and then the granules are processed.

14. The process for the production of molded parts from the polyamide molding materials according to claim 1, by injection molding, extrusion, pultrusion, blow molding or other molding techniques.

15. A molded part obtained from the polyamide molding materials according to claim 1.

16. The molded part according to claim 15, wherein it is a mobile phone housing or a mobile phone housing part.

17. In a method for the manufacture of molded parts, comprising molding such a part by injection molding with a reinforced polyamide molding material, the improvement being that said reinforced polyamide molding material comprises the reinforced polyamide molding material of claim 1 having a notch impact strength of more than 25 kJ/m² (measured according to Charpy at 23° C., according to ISO 179/2-1 eA).

18. The polyamide molding materials according to claim 1, wherein the flat glass fibers, which are added as chopped glass strands, have a diameter of the main cross-sectional axis of 6 to 40 μm and a diameter of the secondary cross-sectional axis from 3 to 20 μm, wherein the ratio of the perpendicular cross-sectional axes is between 3 and 4.

19. The polyamide molding materials according to claim 1, wherein the flat glass fibers are selected from E glass fibers, A glass fibers, C glass fibers, D glass fibers, M glass fibers, S glass fibers or R glass fibers or mixtures thereof, wherein the fibers have an amino coating or epoxy silane coating.

20. The polyamide molding materials according to claim 1, wherein the at least one aliphatic, partly crystalline polyamide of component (A) has a solution viscosity $\eta_{rel}$, measured in m-cresol (0.5 wt.-%), of $\eta_{rel}$ less than 1.7.

21. The polyamide molding materials according to claim 1, wherein the at least one aliphatic, partly crystalline polyamide of component (A) has a solution viscosity $\eta_{rel}$, measured in m-cresol (0.5 wt.-%), of $\eta_{rel}$ less than 1.7.

22. The polyamide molding materials according to claim 1, wherein at least one aliphatic, partly crystalline polyamide of component (A) has a solution viscosity $\eta_{rel}$, measured in m-cresol (0.5 wt.-%), of $\eta_{rel}$ of more than 1.3 to less than 1.9.

23. The polyamide molding materials according to claim 1, wherein at least one aliphatic, partly crystalline polyamide of component (A) has a solution viscosity $\eta_{rel}$, measured in m-cresol (0.5 wt.-%), of $\eta_{rel}$ of more than 1.35 to less than 1.9.

24. The polyamide molding materials according to claim 1, wherein at least one aliphatic, partly crystalline polyamide of component (A) has a solution viscosity $\eta_{rel}$, measured in m-cresol (0.5 wt.-%), of $\eta_{rel}$ of 1.6 to 1.9.

25. The polyamide molding materials according to claim 1, wherein the at least one microcrystalline or amorphous polyamide is PA 6I/6T.

26. The polyamide molding materials according to claim 1, wherein further usual additives and adjuvants (E) in the molding material are selected from the group of conductivity additives, selected from the group of carbon black and/or carbon nanotubes.

27. An injection molded part, obtainable from the polyamide molding materials according to claim 1.

28. The polyamide molding materials according to claim 1, wherein the component (A) is Polyamide 12.

29. The polyamide molding materials according to claim 1, wherein the polyamide components (A) and/or (B) both have a numerical average molecular weight of more than 10,000 g/mol and of less than 20,000 g/mol.

30. The polyamide molding materials according to claim 1, wherein the molding material is adapted to and capable of providing thin-walled injection moulded parts having a flow length of greater than 200 mm.

31. Reinforced polyamide molding materials with high notch impact strength comprising low viscous polyamides and flat glass fibers as a reinforcing medium, consisting of:
 a polyamide matrix, consisting of the following components:
 (A) 20 to 60 by weight of polyamide 66 with a solution viscosity $\eta_{rel}$, measured in m-cresol (0.5 wt-%), of more than 1.3 and of less than 1.9,
 (B) 3 to 17 % by weight of: polyamide 6I/6T with a solution viscosity $\eta_{rel}$, measured in m-cresol (0.5 wt-%), of more than 1.3 and of less than 1.9,
 with the prerequisite that at least 50 weight parts aliphatic blocks (A) are present in the mixture, and
 a filler component, consisting of:
 (C) 40 to 80 wt.-% flat glass fibers with elongated shape, and the glass fibers have a non-circular cross-sectional area and a size ratio of the main cross-sectional axis to the secondary cross-sectional axis of between 2 to 5, and
 (D) 0 to 40 wt.-% particle like or layer like fillers, with the prerequisite that carbon fibers are excluded, wherein the polyamide molding materials optionally comprise up to 5 wt.-% of further usual additives and adjuvants (E), and wherein the weight of the components (A) to (E) sums up to 100%.

32. Reinforced polyamide molding materials with high notch impact strength, comprising low viscous polyamides and flat glass fibers as a reinforcing medium, consisting of:

a polyamide matrix, consisting of the following components:

(A) 0 to 60 % of at least one aliphatic, partly crystalline polyamide selected from the group consisting of: polyamide 12, polyamide 66, or a mixture thereof, in each case with a solution viscosity $\eta_{rel}$, measured in m-cresol (0.5 wt-%), of more than 1.3 and of less than 1.9, (B) 0 to 60 % of at least one amorphous or microcrystalline polyamide selected from the group consisting of: polyamide 6I/6T, polyamide MACM12, polyamide MACM14, polyamide MACMI/12, or mixtures thereof, with a solution viscosity $\eta_{rel}$, measured in m-cresol (0.5 wt-%), of more than 1.3 and of less than 1.9, wherein the prerequisite that at least 50 weight parts aliphatic blocks (A) are present in the mixture, and a filler component, consisting of:

(C) 40 to 80 wt.-% flat glass fibers with elongated shape, and the glass fibers have a non-circular cross-sectional area and a size ratio of the main cross-sectional axis to the secondary cross-sectional axis of between 2 to 5, and (D) 0 to 40 wt.-% particle fillers or layer fillers, with the prerequisite that carbon fibers are excluded, wherein the polyamide molding materials optionally comprise up to 5 wt.-% of further usual additives and auxiliary (E), and wherein the weight of the components (A) to (E) sums up to 100%.

* * * * *